(12) United States Patent
Fukushima et al.

(10) Patent No.: US 7,123,996 B2
(45) Date of Patent: Oct. 17, 2006

(54) THERMAL MANAGEMENT SET-TEMPERATURE CORRECTION FOR INDIVIDUAL SYSTEM

(75) Inventors: Toshiaki Fukushima, Yamato (JP); Taichiroh Nomura, Sagamihara (JP); Shigeru Ohshita, Yokohama (JP); Jun Tanaka, Zama (JP)

(73) Assignee: Lenovo (Singapore) Pte Ltd., Singapore (SG)

( * ) Notice: Subject to any disclaimer, the term of this patent is extended or adjusted under 35 U.S.C. 154(b) by 0 days.

(21) Appl. No.: 10/863,684

(22) Filed: Jun. 8, 2004

(65) Prior Publication Data

US 2005/0004717 A1    Jan. 6, 2005

(30) Foreign Application Priority Data

Jun. 13, 2003    (JP) .............................. 2003-169127

(51) Int. Cl.
G05D 23/19    (2006.01)
G06F 1/20    (2006.01)
(52) U.S. Cl. ...................... 700/299; 700/300; 361/687; 361/695; 165/104.33
(58) Field of Classification Search ................ 700/299, 700/300, 276, 278; 361/687, 694, 699, 697, 361/683, 695; 165/101, 104.33, 299, 300; 340/584
See application file for complete search history.

(56) References Cited

U.S. PATENT DOCUMENTS 6,134,667 A * 10/2000 Suzuki et al. ............... 361/687
6,622,104 B1 * 9/2003 Wang et al. .................. 700/32

* cited by examiner

Primary Examiner—Leo Picard
Assistant Examiner—Charles Kasenge
(74) Attorney, Agent, or Firm—Ference & Associates

(57) ABSTRACT

A system includes a CPU, a stor for storing a process executed for lowering the temperature of the CPU in association with a set temperature, a first temperature sensor for measuring a measurement temperature of a measurement position in the CPU, a second temperature sensor for detecting that a detection position in the CPU has reached a detection temperature, an offset calculator for calculating an offset as a difference between the detection temperature and the measurement temperature, a set temperature corrector for calculating a correction value of the set temperature stored by the temperature control information stor based on the offset, and a temperature control executor for executing the temperature control process in association with the set temperature in the case where the measurement temperature has reached the correction value of the set temperature. System specific thermal management data is stored in a nonvolatile memory for retrieval following system initialization.

11 Claims, 4 Drawing Sheets

(a)

103

| Shutdown | Freq. | | Fan Hi | | Fan Low | |
|---|---|---|---|---|---|---|
| | Up | Down | Up | Down | Up | Down |
| 100 | 94 | 87 | 86 | 80 | 69 | 64 |

(b)

112

| Shutdown | Freq. | | Fan Hi | | Fan Low | |
|---|---|---|---|---|---|---|
| | Up | Down | Up | Down | Up | Down |
| 77 | 71 | 64 | 63 | 57 | 46 | 41 |

THERMAL MANAGEMENT SET-TEMPERATURE CORRECTION FOR INDIVIDUAL SYSTEM

BACKGROUND OF THE INVENTION

This invention pertains to an information processing system, a set temperature correction method, a program, and a recording medium. Particularly, the present invention relates to an information processing apparatus for measuring a temperature and executing a temperature control process based on the measured temperature.

In a conventional information processing system, a temperature control process such as rotating a fan, lowering performance thereof, and forcibly shutting down the apparatus is performed in accordance with temperature changes accompanied with variations of a load of a central processing unit and the like. However, in the information processing apparatus, a position at which temperature is desired to be measured, such as the inside of the central processing unit, differs from a position at which temperature can be measured, such as the outside of the central processing unit. Therefore, the temperature of the position at which temperature is desired to be measured is calculated from the temperature of the position at which temperature can be measured in consideration of a temperature difference between these two positions, and a set temperature for controlling execution of the temperature control process is determined. Then, the temperature of the position at which temperature can be measured is compared with the set temperature, thus performing the temperature control process.

Since the presence of documents of the related art is not recognized, description regarding the documents of the related art is omitted.

However, heretofore, the temperature difference between the above-described two positions has actually been measured for each of a part of information processing apparatuses of the same model, and the set temperature determined based on the same temperature difference has been set for all of the information processing apparatuses of the same model. In this case, if there are individual differences in temperature difference among the information processing apparatuses, the set temperature must be set for all of the information processing apparatuses by use of the largest temperature difference among the actually measured temperature differences in order that all of the information processing apparatuses may not exceed a predetermined temperature. Therefore, in an information processing apparatus in which the temperature difference between the two positions is small, the temperature control process such as rotating the fan, lowering the performance, and forcibly shutting down the apparatus is performed before the actual temperature of the position at which the temperature is desired to be measured reaches the temperature at which the temperature control process is to be performed, thus deteriorating an environment of a user. Moreover, heretofore, when such a problem occurs after the information processing apparatuses are introduced to a customer, there has been no means for changing the set temperature for the temperature control process, and the problem has not been solvable.

SUMMARY OF THE INVENTION

In this connection, it is a purpose of the present invention to provide an information processing apparatus, a set temperature correction method, a program, and a recording medium, which are capable of solving the problem described above. This purpose is attained by a combination of features described in independent claims in the scope of claims. Moreover, dependent claims define more advantageous concrete examples of the present invention.

Specifically, according to a first aspect of the present invention, there is provided an information processing apparatus for measuring a temperature and executing a temperature control process based on the measured temperature, the apparatus comprising: a device generating heat by operating; a temperature control information storage unit for storing a temperature control process in association with a set temperature as a preset temperature, the temperature control process being executed for lowering a temperature of the device; a temperature measurement unit for measuring a measurement temperature as a temperature of a measurement position in the device; a temperature detection unit for detecting that a detection position in the device has reached a first detection temperature as a predetermined temperature; an offset calculation unit for calculating a first offset as a difference between the first detection temperature and the measurement temperature measured by the temperature measurement unit when the temperature detection unit detects the first detection temperature; a set temperature correction unit for calculating a correction value of the set temperature stored by the temperature control information storage unit based on the first offset calculated by the offset calculation unit; and a temperature control execution unit for executing the temperature control process stored by the temperature control information storage unit in association with the set temperature when the measurement temperature measured by the temperature measurement unit has reached the correction value of the set temperature.

Moreover, according to a second aspect of the present invention, there is provided a set temperature correction method for correcting a set temperature as a preset temperature in an information processing apparatus for storing a temperature control process executed for lowering a temperature of a device in association with the set temperature, the method comprising the steps of: detecting that a detection position in the device has reached a first detection temperature as a predetermined temperature; measuring a measurement temperature as a temperature of a measurement position in the device when the first detection temperature is detected in the step of temperature detection; calculating a first offset as a difference between the first detection temperature and the measurement temperature measured in the step of temperature measurement; and calculating a correction value of the set temperature stored by the information processing apparatus based on the first offset calculated in the step of offset calculation.

Note that the above-described summary of the invention is not one listing all features necessary for the present invention, and subcombinations of groups of these features can also be incorporated in the invention.

BRIEF DESCRIPTION OF THE DRAWINGS

Some of the purposes of the invention having been stated, others will appear as the description proceeds, when taken in connection with the accompanying drawings, in which:

FIG. 2(b) is a table showing an example of corrected temperature control information stored in a temperature correction value storage unit 112;

DETAILED DESCRIPTION OF THE ILLUSTRATIVE EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Referring now more particularly to the accompanying drawings, in which like numerals indicate like elements or steps throughout the several views, a preferred embodiment of the present invention will be described.

Figure 1:
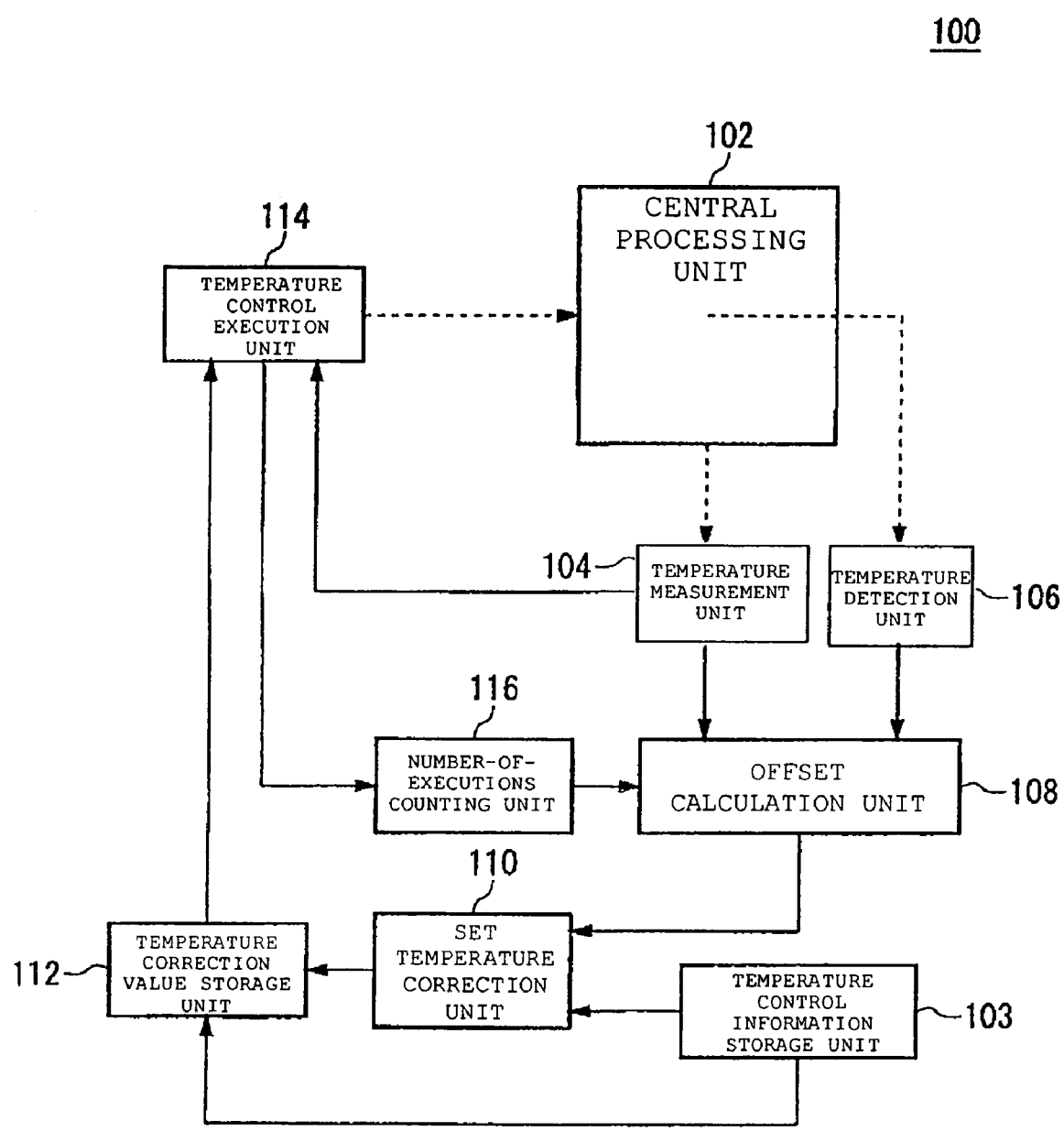
FIG. 1 is a diagram showing an example of a functional configuration of an information processing apparatus 100.

FIG. 1 shows an example of a functional configuration of an information processing apparatus 100 according to one embodiment of the present invention. The information processing apparatus 100 executes a temperature control process of adjusting a temperature of a device provided in the information processing apparatus 100 in response thereto by use of a thermal table storing a fan rotation speed and the like as items of a temperature control process in association with the temperature. Then, the information processing apparatus 100 maintains the temperature of the device in a predetermined temperature range. The information processing apparatus 100 of this embodiment has an object to create a thermal table matched with characteristics of each information processing apparatus 100 and to perform a suitable temperature control process in accordance with an individual difference of the information processing apparatus 100.

Note that, while this embodiment is described by use of a central processing unit 102 executing a command as an example of the device according to the present invention, the device according to the present invention is not limited to the central processing unit 102, and may be a memory LSI of a RAM, a ROM or the like, and a control LSI of an input/output controller, a graphic controller or the like.

The information processing apparatus 100 includes the central processing unit 102 generating heat by operating, a temperature control information storage unit 103 for storing the temperature control process in association with a set temperature, a temperature measurement unit 104 for measuring a measurement temperature as a temperature of a measurement position in the central processing unit 102, a temperature detection unit 106 for detecting that a detection position in the central processing unit 102 has reached a detection temperature as a predetermined temperature, an offset calculation unit 108 for calculating an offset as a difference between the measurement temperature and the detection temperature, a set temperature correction unit 110 for calculating a correction value of the set temperature based on the offset, a temperature correction value storage unit 112 for storing the temperature control process in association with the correction value of the set temperature, a temperature control execution unit 114 for executing the temperature control process, and a number-of-executions counting unit 116 for counting a number of times that the temperature control execution unit 114 executes the temperature control process.

The temperature measurement unit 104 measures the measurement temperature of a peripheral portion of an outside of an LSI of the central processing unit 102 or an inside of the LSI of the central processing unit 102. For example, the temperature measurement unit 104 is a thermal diode or a thermocouple, and attached to the measurement position as a position at which the temperature of the central processing unit 102 can be measured from the outside of the central processing unit 102 in a manufacturing process of the information processing apparatus 100. Moreover, the temperature detection unit 106 detects a detection temperature of a detection position of a center portion inside the LSI of the central processing unit 102. The temperature detection unit 106 receives a notice indicating that the temperature of the detection position has reached the detection temperature from a temperature sensor attached to the detection position as a position at which the set temperature inside the central processing unit 102 can be sensed in a manufacturing step of the central processing unit 102.

When the temperature detection unit 106 detects the detection temperature, the offset calculation unit 108 calculates the offset as a difference between the detection temperature and the measurement temperature measured by the temperature measurement unit 104. Specifically, the offset calculation unit 108 calculates the temperature difference between the temperature of the center portion inside the central processing unit 102 and the temperature of the peripheral portion of the outside or inside thereof. The set temperature correction unit 110 calculates the correction value of the set temperature stored by the temperature control information storage unit 103 based on the offset calculated by the offset calculation unit 108.

The temperature control information storage unit 103 stores the temperature control process executed for lowering the temperature of the central processing unit 102 in association with the set temperature as a temperature predetermined in a design step of the information processing apparatus 100. Specifically, in association with the set temperature, the temperature control information storage unit 103 stores the temperature control process to be executed in the case where the temperature of the detection position in the central processing unit 102 has reached the set temperature.

In association with the correction value of the set temperature, which is corrected by the set temperature correction unit 110, the temperature correction value storage unit 112 stores the temperature control process stored in association with the set temperature by the temperature control information storage unit 103. Specifically, in association with the correction value of the set temperature, the temperature correction value storage unit 112 stores the temperature control processes to be executed in the case where the temperature of the measurement position in the central processing unit 102 has reached the correction value of the set temperature.

The temperature control execution unit 114 monitors the measurement temperature measured by the temperature measurement unit 104. Then, in the case where the measurement temperature measured by the temperature measurement unit 104 has reached the correction value of the set temperature stored by the temperature correction value storage unit 112, the temperature control execution unit 114 executes the temperature control process stored by the temperature correction value storage unit 112 in association with the correction value of the set temperature. Then, the temperature control execution unit 114 lowers the temperature of the central processing unit 102. The temperature control execution unit 114 is, for example, a fan, and sends air to the central processing unit 102 based on the measurement temperature measured by the temperature measurement unit 104. Moreover, the temperature control execution unit 114 may control an operating speed of the central processing unit 102 or may control the operation of the central processing unit 102 to be halted based on the measurement temperature measured by the temperature measurement unit 104.

In such a way, the set temperature at which the temperature control process is executed can be adjusted in response to the characteristics of the information processing apparatus 100 and central processing unit 102, and accordingly, a suitable set temperature for each information processing apparatus 100 can be set. Therefore, the suitable temperature control process can be executed without being affected by the individual difference of the information processing apparatus 100, and a wasteful temperature control process can be prevented.

Meanwhile, the number-of-executions counting unit 116 counts the number of times of the temperature control process executed by the temperature control execution unit 114. The temperature control process is one executed by that the measurement temperature measured by the temperature measurement unit 104 reaches the correction value of the set temperature, which is calculated by the set temperature correction unit. Moreover, the number-of-executions counting unit 116 holds a predetermined number of times per unit time, and notifies, to the offset calculation unit 108, that the number of times counted has exceeded the predetermined number of times when this excess occurs during a normal operation of the information processing apparatus 100. Upon receiving the notice from the number-of-executions counting unit 116, the offset calculation unit 108 newly calculates the offset between the detection temperature and the measurement temperature measured by the temperature measurement unit 104 when the temperature detection unit 106 newly detects the detection temperature. The set temperature correction unit 110 again calculates the correction value of the set temperature stored by the temperature control information storage unit 103 based on the offset newly calculated by the offset calculation unit 108, and updates the correction value of the set temperature stored by the temperature correction value storage unit 112. Note that, in another example, the offset may be calculated periodically, for example, once in every month, and the correction value of the set temperature may be calculated and updated.

As described above, even if it is judged that the temperature control process is not executed efficiently due to a change in an operating status of the central processing unit 102, a change in an environment of the information processing apparatus 100, and the like, the set temperature can be updated appropriately, and the wasteful temperature control process can be suppressed.

FIG. 2(a) shows an example of temperature control information stored by the temperature control information storage unit 103 according to this embodiment. FIG. 2(b) shows an example of corrected temperature control information stored by the temperature correction value storage unit 112 according to this embodiment.

As shown in FIGS. 2(a) and 2(b), the temperature control information storage unit 103 stores a plurality of different temperature control processes individually in association with a plurality of different set temperatures. For example, the temperature control information storage unit 103 and the temperature correction value storage unit 112 store set temperatures at which an operation system is forcibly shut down (Shutdown), set temperatures at which a frequency of the central processing unit 102 is reduced, set temperatures at which the fan rotation speed is accelerated (Fan Hi), and set temperatures at which the fan rotation speed is decelerated (Fan Low). Furthermore, in association with the temperature control processes, the temperature control information storage unit 103 stores a set temperature at which the temperature control process is executed in the case where the temperature of the detection position has reached the set temperature because of a drop thereof, and a set temperature at which the temperature control process is executed in the case where the temperature of the detection position has reached the set temperature because of a rise thereof.

Moreover, as shown in FIG. 2(b), the temperature correction value storage unit 112 stores a plurality of different temperature control processes individually in association with correction values of a plurality of different set temperatures similarly to the temperature control information storage unit 103. Furthermore, in association with the temperature control processes, the temperature correction value storage unit 112 stores a set temperature at which the temperature control process is executed in the case where the measurement temperature measured by the temperature measurement unit 104 has reached the set temperature because of a drop thereof, and a set temperature at which the temperature control process is executed in the case where the measurement temperature has reached the set temperature because of a rise thereof. For example, the temperature control execution unit 114 reduces the frequency of the central processing unit 102 in the case where the measurement temperature has reached 94° C. because of the rise thereof when the fan rotation speed is high, and switches the fan rotation speed from the high speed to the low speed in the case where the measurement temperature has reached 80° C. because of the drop thereof when the fan rotation speed is high.

As shown in FIGS. 2(a) and 2(b), the set temperature correction unit 110 calculates the correction values of the set temperatures stored by the temperature correction value storage unit 112 by subtracting the offset calculated by the offset calculation unit 108 individually from the plurality of set temperatures stored by the temperature control information storage unit 103. FIGS. 2(a) and 2(b) show the case where the offset between the detection temperature and the measurement temperature measured by the temperature measurement unit 104 is 23° C. The temperature correction value storage unit 112 stores temperatures, obtained by subtracting 23° C. individually from the plurality of set temperatures stored by the temperature control information storage unit 103, as the correction values of the set temperatures.

Moreover, in another example, the set temperature correction unit 110 may calculate the correction values of the set temperatures by reducing a ratio of the offset calculated by the offset calculation unit 108 individually from the plurality of set temperatures. For example, when the detection temperature is 100° C. and the measurement temperature is 77° C., the set temperature correction unit 110 may calculate the correction values of the set temperatures by reducing 23% individually from the plurality of set temperatures. In this case, a ratio in the Fahrenheit temperature may be reduced, or a ratio in the Celsius temperature may be reduced.

Figures 2, 3:
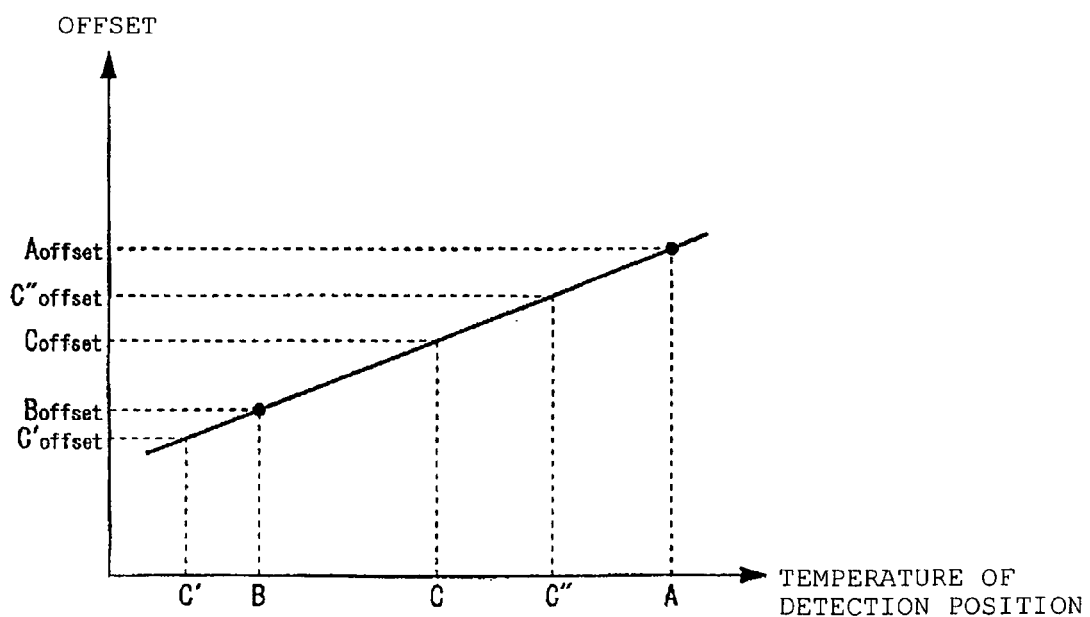
FIG. 2(*a*) is a table showing an example of temperature control information stored in a temperature control information storage unit 103.
FIG. 3 is a graph showing another example of a calculation method for a correction value of a set temperature by a set temperature correction unit 110.

FIG. 3 shows another example of the calculation method for the correction values of the set temperatures by the set temperature correction unit 110 according to this embodiment. In the calculation method for the correction values of the set temperatures, which is described in FIG. 2, the correction values of the plurality of set temperatures are calculated by uniformly subtracting the offset individually from the plurality of set temperatures. However, the correction values of the plurality of set temperatures may also be calculated by estimating offsets in other detection temperatures based on a plurality of the offsets in each of the plurality of detection temperatures.

In this example, the temperature detection unit 106 detects that a detection position in the central processing unit 102 has reached a first detection temperature A, and that the detection position has reached a second detection temperature B lower than the first detection temperature A. Then, the offset calculation unit 108 calculates a first offset Aoffset as a difference between the first detection temperature A and the measurement temperature measured by the temperature measurement unit 104 when the temperature detection unit 106 detects the first detection temperature A. Moreover, the offset calculation unit 108 calculates a second offset Boffset as a difference between a second detection temperature B and the measurement temperature measured by the temperature measurement unit 104 when the temperature detection unit 106 detects the second detection temperature B.

Then, based on the first offset Aoffset and the second offset Boffset, the offset calculation unit 108 calculates third offsets Coffset, C'offset, C"offset and the like as differences between temperatures of detection positions and temperatures of measurement positions when the temperature of the detection position of the central processing unit 102 is temperatures C, C', C" and the like, which are other than the first detection temperature A or the second detection temperature B. Specifically, the offset calculation unit 108 obtains a relation between the temperature of the detection position and the offset based on the first and second detection temperatures A and B and the first and second offsets Aoffset and Boffset, and calculates the third offsets Coffset, C'offset, C"offset and the like. Then, based on the third offsets Coffset, C'offset, C"offset and the like, which are calculated by the offset calculation unit 108, the set temperature correction unit 110 calculates the correction values of the plurality of set temperatures stored by the temperature control information storage unit 103.

In such a way, the relation between the temperature of the detection position and the temperature of the measurement position can be obtained based on the plurality of detection temperatures detected by the temperature detection unit 106 and the plurality of offsets calculated by the offset calculation unit 108 in the plurality of detection temperatures. Then, based on this relation, offsets in a range where the temperatures cannot be detected in the detection positions of the central processing unit 102 can be estimated. Accordingly, the set temperature correction unit 110 can precisely calculate the respective correction values of the plurality of set temperatures stored by the temperature control information storage unit 103.

Figure 4:
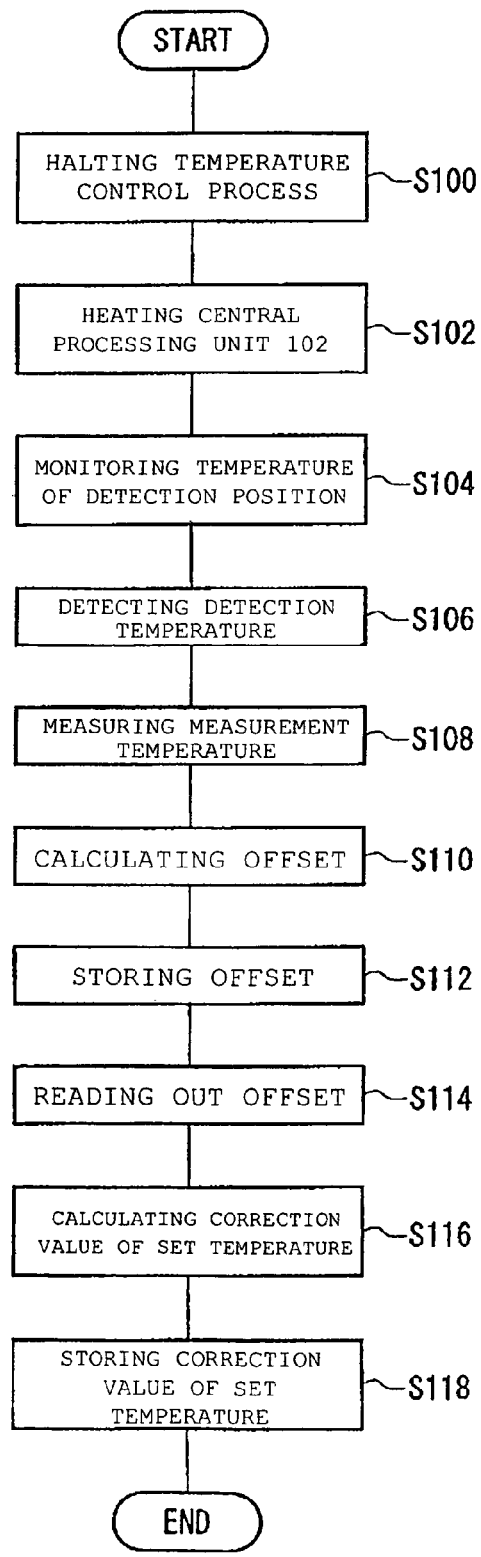
FIG. 4 is a flowchart showing an example of a set temperature correction method by the information processing apparatus 100.

FIG. 4 shows an example of a set temperature correction method by the information processing apparatus 100 according to this embodiment. A program for a set temperature correction, which is prepared in advance, is executed by a user during the operation of the information processing apparatus 100, and thus the set temperature correction according to this embodiment is started. First, the temperature control execution unit 114 performs a temperature control process for lowering the temperature of the central processing unit 102, for example, halts sending air by means of a fan (S100). Then, the central processing unit 102 is forced to execute a command of a high load, such as a floating-point arithmetic, and thus the central processing unit 102 is heated (S102). The temperature detection unit 106 monitors the temperature of the detection position of the heated central processing unit 102 (S104), and detects that the detection position has reached the detection temperature, for example, 100° C. (S106). The temperature measurement unit 104 measures the measurement temperature of the measurement position of the central processing unit 102 when the detection temperature is detected by the temperature detection unit 106 (S108). Then, the offset calculation unit 108 calculates the offset as the difference between the detection temperature and the measurement temperature measured by the temperature measurement unit 104 (S110). Then, the offset calculation unit 108 stores the calculated offset in a nonvolatile memory such as an electrically programmable ROM 220 shown in FIG. 5 (S112) or a battery backed up CMOS NVRAM (not shown) or a flash memory (not shown).

Next, the set temperature correction unit 110 reads out the offset from the nonvolatile memory when the information processing apparatus 100 is activated (S114). Then, the set temperature correction unit 110 calculates the correction value of the set temperature to be stored by the temperature control information storage unit 103 based on the offset read out from the nonvolatile memory (S116). Then, the temperature correction value storage unit 112 stores the correction value of the set temperature, which is calculated by the set temperature correction unit 110 (S118). Note that Steps S104 through S112 are executed by the central processing unit 102 and an embedded controller 224, which are shown in FIG. 5, and Steps S114 through S118 are executed in a POST (Power On Self Test) by a BIOS stored in the ROM 220 shown in FIG. 5.

According to the set temperature correction method described above, the correction value of the set temperature stored by the temperature correction value storage unit 112 is set or updated, and thereafter, the temperature control execution unit 114 performs the temperature control process based on the corrected temperature control information stored by the temperature correction value storage unit 112.

Figure 5:
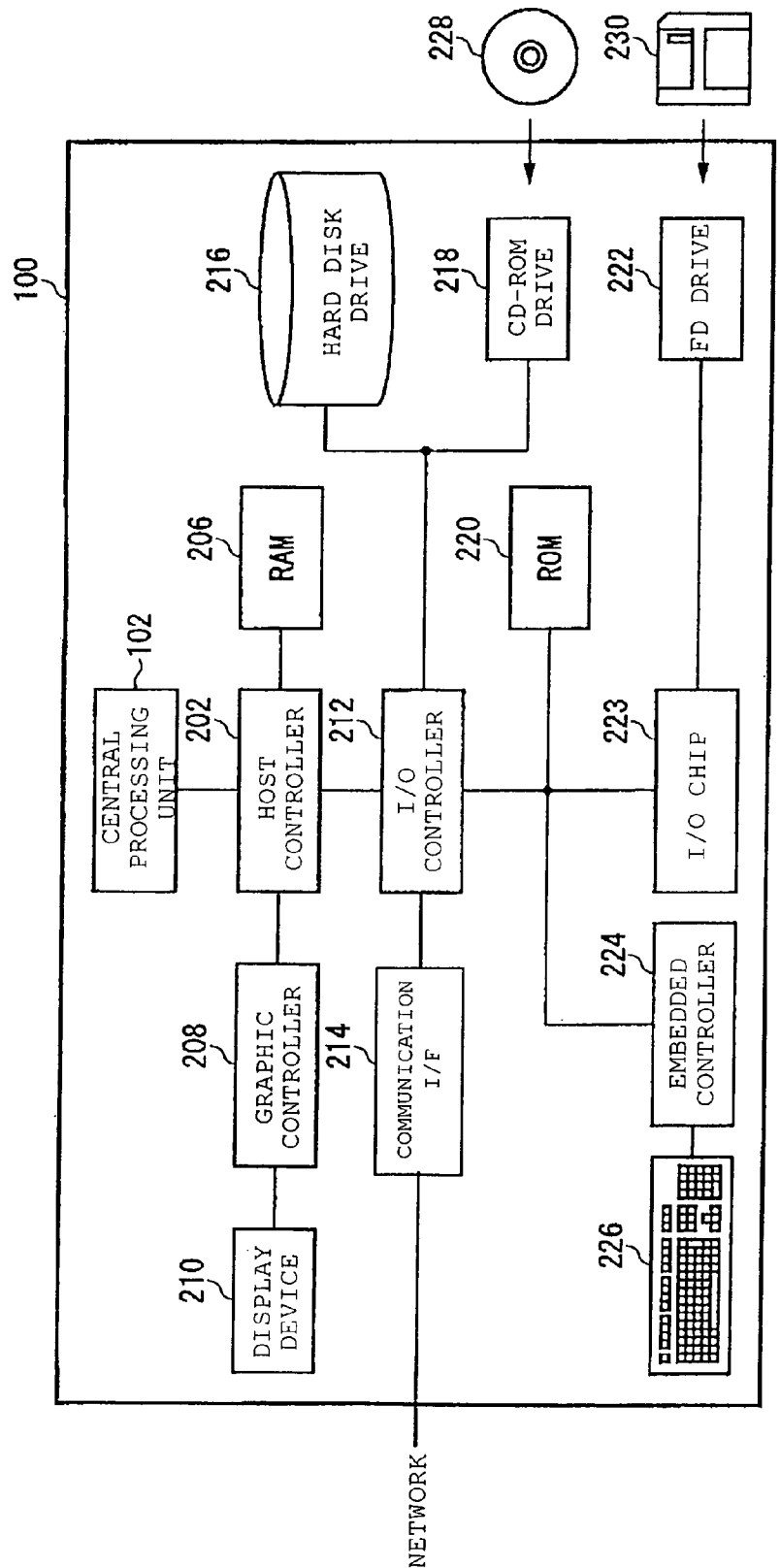
FIG. 5 is a diagram showing an example of a hardware configuration of the information processing apparatus 100.

FIG. 5 shows an example of a hardware configuration of the information processing apparatus 100 according to this embodiment. The information processing apparatus 100 includes a CPU and its peripheral section having the central processing unit 102, a RAM 206, a graphic controller 208, and a display device 210, which are interconnected by a host controller 202, an input/output section having a communication interface 214, a hard disk drive 216, and a CD-ROM drive 218, which are connected to the host controller 202 by the input/output controller 212, a legacy input/output unit having the ROM 220, a flexible disk drive 222, an input/output chip 223, and the embedded controller 224, which are connected to the input/output controller 212, and a keyboard 226 connected to the embedded controller 224.

The host controller 202 connects the central processing unit 102 and the graphic controller 208, which access the RAM 206 at a high transfer rate, to the RAM 206. The central processing unit 102 operates based on programs stored in the RAM 206 and the ROM 220, and controls the respective units. Moreover, the central processing unit 102 realizes a function of an operating system or the like, which manages an operation of an application program. Furthermore, the graphic controller 208 acquires image data created on a frame buffer provided in the RAM 206 by the central processing unit 102, and displays the acquired image data on the display device 210.

The input/output controller 212 connects the communication interface 214, the hard disk drive 216, and the CD-ROM drive 218, which are relatively high-speed input/output devices, to the host controller 202. The communication interface 214 communicates with other devices through a network. The hard disk drive 216 stores a program and data for use in the information processing apparatus 100. The CD-ROM drive 218 reads a program or data from a CD-ROM 228, and provides the read program or data to the central processing unit 102 through the RAM 206.

Moreover, relatively low-speed input/output devices such as the ROM 220, the embedded controller 224 and the flexible disk drive 222 are connected to the input/output controller 212. The ROM 220 stores a boot program (BIOS) executed by the central processing unit 102 at the time of activation of the information processing apparatus 100, a program depending on hardware of the embedded controller 224, and the like. The flexible disk drive 222 reads a program or data from a flexible disk 230, and provides the read program or data to the central processing unit 102 through the RAM 206.

An input/output device such as the keyboard 226 is connected to the embedded controller 224. An input/output device such as the flexible disk drive 222 is connected to the input/output chip 223. The embedded controller 224 operates without using the function of the operating system, and for example, operates according to a program such as firmware stored in a nonvolatile memory such as the ROM 220.

The program realizing the operation of the central processing unit 102 or embedded controller 224 includes a temperature control information storage module, a temperature measurement module, a temperature detection module, an offset calculation module, a set temperature correction module, a temperature correction value storage module, a temperature control execution module, and a number-of-executions counting module. These modules are programs allowing the central processing unit 102 or the embedded controller 224 to function as the temperature control information storage unit 103, the temperature measurement unit 104, the temperature detection unit 106, the offset calculation unit 108, the set temperature correction unit 110, the temperature correction value storage unit 112, the temperature control execution unit 114, and the number-of-executions counting unit 116, which are shown in FIG. 1.

The program provided to the information processing apparatus 100, such as the program realizing the operation of the central processing unit 102 or the embedded controller 224, is stored in a recording medium such as the CD-ROM 228, the flexible disk 230 and an IC card, and provided by a user. This program is read out from the recording medium, installed into the ROM 220, and then executed.

The programs and the modules, which are described above, may be stored in an external storage medium. As the storage medium, an optical recording medium such as a DVD and a PD, an magneto-optical recording medium such as an MD, a tape medium, a semiconductor memory such as an IC card, and the like may be used as well as the CD-ROM 228 and the flexible disk 230. Moreover, a program may be provided to the information processing apparatus 100 through a network such as a dedicated communication network or the Internet by use of a storage device as a recording medium, such as a hard disk and a RAM, provided in a server system connected to the network.

According to the information processing apparatus 100 of this embodiment, the set temperature for the temperature control process in accordance with the characteristics of the information processing apparatus 100 and central processing unit 102 can be set or updated easily. Therefore, even if there is an individual difference in offset among the information processing apparatuses 100, the temperature can be set not to exceed the allowable temperature in the information processing apparatus 100 of which offset is large, and the temperature control process such as rotating the fan, lowering the performance, and forcibly shutting down the apparatus can be prevented from being performed wastefully in the information processing apparatus 100 of which offset is small. Moreover, in accordance with the set temperature correction method according to this embodiment, accurate measurement of a TDP (Thermal Design Point) is made possible. Furthermore, the thermal table of the products before the shipment can be set appropriately in the factory, and the thermal table of the products after the shipment can be reset easily by a simple operation such as updating the BIOS.

Although the present invention has been described above based on the embodiment, the technical scope of the present invention is not limited to the scope according to the above-described embodiment. A variety of alterations and improvements can be added to the above-described embodiment. It is obvious from the description of claims that aspects added with the alterations or improvements as described above can also be incorporated in the technical scope of the present invention.

According to the embodiment described above, information processing apparatuses, set temperature correction methods, a program, and a recording medium, which are described in the respective items below, are realized. As obvious from the above description, according to the present invention, the information processing apparatus capable of adjusting, in response to the characteristics of the information processing apparatus, the set temperature at which the temperature control process is executed can be provided.

In the drawings and specifications there has been set forth a preferred embodiment of the invention and, although specific terms are used, the description thus given uses terminology in a generic and descriptive sense only and not for purposes of limitation.

We claim as our invention:

1. An aparatus comprising:
a device which generates heat in an information processing apparatus;
a temperature control information storage unit which retains a temperature control process in association with a set temperature as a preset temperature, the temperature control process being executed for lowering the temperature of said device;
a temperature sensor which is operatively coupled to said device and which measures a measurement temperature as a temperature of a measurement position in said device;
a temperature detector which is operatively coupled to said device and which detects that a detection position in said device has reached a first detection temperature as a predetermined temperature;

an offset calculator which is operatively coupled to said temperature sensor and said temperature detector and which calculates a first offset as a difference between the first detection temperature and the measurement temperature measured by the temperature measurer in response to said temperature detector detecting the first detection temperature;

a set temperature corrector which is operatively coupled to said offset calculator and which calculates a correction value of the set temperature scored by said temperature control information storage unit based on the first offset calculated by said offset calculator; and a temperature control executor which is operatively coupled to said temperature control information storage unit and said device and which executes the temperature control process stored by said temperature control information storage unit in association with the set temperature in response to a condition in which the measurement temperature measured by the temperature measurer has reached the correction value of the set temperature;

wherein said device is a central processing unit;

wherein said temperature sensor measures the temperature of the measurement position of a peripheral portion selected from the group consisting of an outside of an LSI of the central processing unit and an inside of the LSI of the central processing unit; and wherein said temperature detector detects a temperature of the detection position of a center portion in the inside of the LSI of the central processing unit.

2. The apparatus according to claim 1 wherein said set temperature corrector calculates the correction value of the set temperature retained by said temperature control information storage unit by subtracting the first offset from the set temperature retained by said temperature control information storage unit.

3. The apparatus according to claim 2, wherein
said temperature control information storage unit retains a plurality of the different temperature control processes individually in association with a plurality of the different set temperatures, and said set temperature corrector calculates the correction values of the plurality of set temperatures retained by said temperature control information storage unit by subtracting the first offset individually from the plurality of set temperatures.

4. The apparatus according to claim 1, further comprising:
a counter which is coupled to said temperature control executor and said offset calculator and which counts a number of times that the temperature control executor executes the temperature control process in response to a condition in which the measurement temperature reaches the correction value of the set temperature, wherein, in a case where a number of times counted by the counter per unit time has exceeded a predetermined number during an operation of the information processing apparatus, said offset calculator newly calculates the first offset between the first detection temperature and the measurement temperature measured by the temperature measurer when said temperature detector newly detects the first detection temperature, and said set temperature corrector again calculates the correction value of the set temperature retained by said temperature control information storage unit based on the first offset newly calculated by said offset calculator.

5. The apparatus according to claim 1, wherein
said temperature control information storage unit retains a plurality of the different temperature control processes individually in association with a plurality of the different set temperatures, said temperature detector further detects that a detection position in said device has reached a second detection temperature as a predetermined temperature lower than the first detection temperature, said offset calculator further calculates a second offset as a difference between the second detection temperature and the measurement temperature measured by the temperature measurer when said temperature detector detects the second detection temperature, and calculates, based on the first offset and the second offset, a third offset as a difference between a temperature of the detection position and a temperature of the measurement position when the detection position is at a temperature other than the first detection temperature and the second detection temperature, and said set temperature corrector calculates the correction values of the plurality of set temperatures stored by said temperature control information storage unit based on a plurality of the third offsets calculated by said offset calculator.

6. The apparatus according to claim 1, wherein
said offset calculator stores the calculated first offset in a nonvolatile memory, and said set temperature corrector reads out the first offset from the nonvolatile memory at a time of activation of the information processing apparatus, and calculates the correction value of the set temperature stored by said temperature control information storage unit based on the first offset.

7. A method comprising:
detecting that a detection position in a device of an information processing apparatus has reached a first detection temperature as a predetermined temperature, wherein the information processing apparatus includes a set temperature as a preset temperature at which a stored a temperature control process is executed for lowering the temperature of the device in association with the set temperature;

measuring a measurement temperature as a temperature of a measurement position in the device when the first detection temperature is detected by said detection;

calculating a first offset as a difference between the first detection temperature and the measurement temperature measured by said measurement; and calculating a correction value of the set temperature stored by the information processing apparatus based on the first offset calculated in said offset calculation;

wherein said device is a central processing unit;

wherein said measuring measures the temperature of the measurement position of a peripheral portion selected from the group consisting of an outside of an LSI of the central processing unit and an inside of the LSI of the central processing unit; and wherein said detecting detects a temperature of the detection position of a center portion in the inside of the LSI of the central processing unit.

8. The method according to claim 7, wherein
the method further comprises heating the central processing unit by allowing the central processing unit to execute a command, and said detection includes detecting that the detection position of the central processing unit heated in the step of heating has reached the first detection temperature.

9. A product comprising:

a computer readable storage medium having computer readable program code stored therein, said computer readable program code stored in the computer readable storage medium includes code which:

stores a temperature control process in association with a set temperature as a preset temperature, the temperature control process being executed for lowering a temperature of a device which generates heat while operating;

measures a measurement temperature as a temperature of a measurement position in the device;

detects that a detection position in the device has reached a first detection temperature as a predetermined temperature;

calculates a first offset as a difference between the first detection temperature and the measurement temperature in response to said detection of the first detection temperature;

calculates a correction value of the set temperature based on the first offset; and executes the temperature control process in association with the set temperature in the case where the measurement temperature has reached the correction value of the set temperature;

wherein said device is a central processing unit;

wherein said measuring measures the temperature of the measurement position of a peripheral portion selected from the group consisting of an outside of an LSI of the central processing unit and an inside of the LSI of the central processing unit; and wherein said detecting detects a termperature of the detection position of a center portion in the inside of the LSI of the central processing unit.

10. An apparatus comprising:

a processor which generates heat while executing instructions stored in a first memory and which includes an internal temperature detector located at a detection position which detects that the detection position has reached a predetermined first detection temperature;

a temperature sensor mounted externally to said processor at a measurement position; and a nonvolatile memory which is coupled to said processor and which stores code to be executed by said processor including temperature control process code to be executed in association with a set temperature as a preset temperature, the temperature control process code being executed for lowering the temperature of said processor;

wherein said processor when executing the instructions being effective to:

store the temperature control process code in said nonvolatile memory which is to be executed in association with the set temperature;

measure a measurement temperature as a temperature of the measurement position of said temperature sensor;

detect that the detection position internal to said processor has reached the first detection temperature;

calculate a first offset as a difference between the first detection temperature and the measurement temperature in response to the detection of the first detection temperature;

calculate a correction value of the set temperature based on the first offset; and execute the temperature control process code stored in said nonvolatile memory in association with the set temperature in the case where the measurement temperature has reached the correction value;

wherein said device is a central processing unit;

wherein said measuring measures the temperature of the measurement position of a peripheral portion selected from the group consisting of an outside of an LSI of the central processing unit and an inside of the 151 of the central processing unit; and wherein said detecting detects a temperature of the detection position of a center portion in the inside of the LSI of the central processing unit.

11. The apparatus of claim 10, further comprising:

an embedded controller which is coupled to the nonvolatile memory and which scores the first offset in the nonvolatile memory as apparatus specific thermal management data;

wherein, upon initialization of the apparatus, said processor utilizes the first offset stored in the nonvolatile memory as an initial offset for at least the calculation of the correction value for the set temperature.

* * * * *

UNITED STATES PATENT AND TRADEMARK OFFICE
CERTIFICATE OF CORRECTION

PATENT NO. : 7,123,996 B2  
APPLICATION NO. : 10/863684  
DATED : October 17, 2006  
INVENTOR(S) : Fukushima et al.

Page 1 of 1

It is certified that error appears in the above-identified patent and that said Letters Patent is hereby corrected as shown below:

Column 10, Line 52 "aparatus" should be --apparatus--

Column 11, Line 10 "scored" should be --stored--

Column 13, Line 34 "termperature" should be --temperature--

Signed and Sealed this

Twenty-second Day of May, 2007

JON W. DUDAS  
*Director of the United States Patent and Trademark Office*